(12) United States Patent
Nakayama

(10) Patent No.: US 9,216,614 B2
(45) Date of Patent: Dec. 22, 2015

(54) RIM FOR A PNEUMATIC TIRE

(75) Inventor: Souto Nakayama, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 260 days.

(21) Appl. No.: 13/977,165

(22) PCT Filed: Feb. 3, 2012

(86) PCT No.: PCT/JP2012/000751
§ 371 (c)(1),
(2), (4) Date: Jun. 28, 2013

(87) PCT Pub. No.: WO2012/105275
PCT Pub. Date: Aug. 9, 2012

(65) Prior Publication Data
US 2013/0270892 A1    Oct. 17, 2013

(30) Foreign Application Priority Data
Feb. 4, 2011  (JP) .................................. 2011-023137

(51) Int. Cl.
*B60B 21/02* (2006.01)
*B60B 21/10* (2006.01)

(52) U.S. Cl.
CPC ............... *B60B 21/104* (2013.01); *B60B 21/02* (2013.01); *B60B 21/026* (2013.01)

(58) Field of Classification Search
CPC ............ B60B 5/00; B60B 5/02; B60B 21/00; B60B 21/02; B60B 21/026; B60B 21/028; B60B 21/04; B60B 21/10; B60B 21/104; B60B 21/106
USPC .............. 301/95.101, 95.107, 95.108, 95.109
See application file for complete search history.

(56) References Cited

U.S. PATENT DOCUMENTS

| 4,434,830 A | * | 3/1984 | Landers | .................... B60C 3/04 |
| | | | | 152/209.14 |
| 5,186,772 A | | 2/1993 | Nakasaki et al. | |

(Continued)

FOREIGN PATENT DOCUMENTS

| EP | 1 588 867 A1 | 10/2005 |
| GB | 2 065 572 A | 7/1981 |

(Continued)

OTHER PUBLICATIONS

Communication dated Jan. 23, 2015 from the State Intellectual Property Office of the People's Republic of China in counterpart application No. 201280007354.8.

(Continued)

*Primary Examiner* — John Walters
(74) *Attorney, Agent, or Firm* — Sughrue Mion, PLLC

(57) ABSTRACT

It is an object of the present invention to provide a rim for a pneumatic tire that can suppress local deformation of the sidewall portion of a mounted tire and thus suppress the occurrence of damage to the sidewall portion. The rim for a pneumatic tire according to the present invention is provided with a pair of bead seat portions separated from each other in a rim width direction and a flange portion extending outwards in a rim radial direction from a rim width direction outer end of each bead seat portion. A rim radial direction outer end of the flange portion is recurved outwards in the rim width direction. A radius of curvature of a surface of the flange portion at a rim width direction outer end portion of the flange portion is at least 0.4 times and at most 1.0 times a radius of curvature of the surface of the flange portion at a rim width direction central portion of the flange portion.

1 Claim, 3 Drawing Sheets

(56) References Cited

U.S. PATENT DOCUMENTS

| | | | |
|---|---|---|---|
| 7,014,274 B2 * | 3/2006 | Guimard | B21D 53/30 |
| | | | 301/95.101 |
| 7,111,910 B2 * | 9/2006 | Abe | B21D 53/30 |
| | | | 29/894.351 |
| 2007/0209745 A1 | 9/2007 | Segawa et al. | |
| 2010/0096190 A1 | 4/2010 | Younger et al. | |
| 2010/0096910 A1 * | 4/2010 | Egbert | B60B 21/104 |
| | | | 301/95.107 |

FOREIGN PATENT DOCUMENTS

| | | | | |
|---|---|---|---|---|
| GB | 2065572 A | * | 7/1981 | B60B 21/02 |
| JP | 58-019042 Y2 | | 4/1983 | |
| JP | 62-128807 A | | 6/1987 | |
| JP | 6-072108 A | | 3/1994 | |
| JP | 2672048 B2 | | 11/1997 | |
| JP | 2005-075294 A | | 3/2005 | |
| JP | 2005-186672 A | | 7/2005 | |
| JP | 2005-289123 A | | 10/2005 | |
| JP | 2007-168737 A | | 7/2007 | |
| JP | 2007-176449 A | | 7/2007 | |
| JP | 3983357 B2 | | 9/2007 | |
| JP | 4064034 B2 | | 3/2008 | |
| JP | 2008-273431 A | | 11/2008 | |
| JP | 4399848 B2 | | 1/2010 | |
| JP | 4729182 B2 | | 7/2011 | |

OTHER PUBLICATIONS

Extended European Search Report, dated Jun. 3, 2014, issued in European Patent Application No. 12742269.9.

International Search Report of PCT/JP2012/000751 dated Apr. 10, 2012.

Japanese Office Action, dated Sep. 30, 2014, issued in corresponding Japanese Patent Application No. 2012-555768.

* cited by examiner (a)

(b)

(a)

(b)

RIM FOR A PNEUMATIC TIRE

CROSS REFERENCE TO RELATED APPLICATIONS

This application is a National Stage of International Application No. PCT/JP2012/000751 filed Feb. 3, 2012, claiming priority based on Japanese Patent Application No. 2011-023137, filed Feb. 4, 2011, the contents of all of which are incorporated herein by reference in their entirety.

TECHNICAL FIELD

The present invention relates to a rim on which a tire is mounted, and in particular to a rim suitable for use with a pneumatic radial tire.

BACKGROUND ART

A conventionally known vehicle wheel on which a tire is mounted is provided with a rim for mounting the tire and a disk attached to an axle hub provided at one side end of the rim in the rim width direction.

As the rim of the wheel, a rim 30 is used, for example as illustrated in the perspective view of FIG. 3(a) and in the width direction cross-sectional diagram in FIG. 3(b). The rim 30 includes a well portion 31 with a generally cylindrical shape, a bead seat portion 32 provided outwards in the rim width direction on each side of the well portion 31 and having a generally annular shape with a larger radius than the well portion 31, and a flange portion 33 provided on each of the bead seat portions 32 outwards in the rim width direction.

When the flange portion of the above conventional rim is viewed in a rim width direction cross-sectional diagram, the radius of curvature $R_0$ of the surface of the flange portion at a rim width direction outer end portion thereof is extremely small as compared to the radius of curvature $R_1$ of the surface of the flange portion at a rim width direction central portion thereof (for example, see Patent Literature 1). Specifically, in a conventional rim, $R_0$ is 0.05 to 0.1 times $R_1$, for example.

CITATION LIST

Patent Literature

PTL 1: JP2005289123A

SUMMARY OF INVENTION

Generally, when a tire is mounted on the rim of the wheel and is run, the tire sidewall portion might deform by bending until contacting the surface of the flange portion at the rim width direction outer end portion thereof if the tire is driven onto a curb or the like. As a result, in the above conventional rim, in which the radius of curvature of the surface of the flange portion at the rim width direction outer end portion thereof is extremely small as viewed in a rim width direction cross-sectional diagram, deformation of a sidewall portion 42 when the tire 40 is driven onto a curb B or the like easily becomes locally large at a position 42a' at which the sidewall portion 42 contacts the rim width direction outer end portion of the flange portion 33 of the rim 30, as illustrated in the rim width direction cross-sectional diagram of a tire and rim assembly in FIG. 2(b). As a result, in a tire and rim assembly using the above conventional rim, damage such as a crack on the outer surface of the tire sidewall portion easily occurs.

To address this problem, it is an object of the present invention to provide a rim for a pneumatic tire that can suppress local deformation of the sidewall portion of a rim-mounted tire and suppress the occurrence of damage to the sidewall portion even when the mounted tire is driven onto a curb or the like.

It is an object of the present invention to resolve the above problems advantageously, and a rim for a pneumatic tire according to the present invention comprises a pair of bead seat portions separated from each other in a rim width direction and a flange portion extending outwards in a rim radial direction from a rim width direction outer end of each bead seat portion, a rim radial direction outer end of the flange portion being recurved outwards in the rim width direction, wherein a radius of curvature of a surface of the flange portion at a rim width direction outer end portion of the flange portion is at least 0.4 times and at most 1.0 times a radius of curvature of the surface of the flange portion at a rim width direction central portion of the flange portion. Thus setting the radius of curvature $R_0$ of the surface of the flange portion at the rim width direction outer end portion thereof to be at least 0.4 times the radius of curvature $R_1$ of the surface of the flange portion at the rim width direction central portion thereof ($R_0/R_1 \geq 0.4$) can suppress local deformation of the sidewall portion of the rim-mounted tire even when the mounted tire is driven onto a curb or the like. Furthermore, setting the radius of curvature $R_0$ of the surface of the flange portion at the rim width direction outer end portion thereof to be at most 1.0 times the radius of curvature $R_1$ of the surface of the flange portion at the rim width direction central portion thereof ($1.0 \geq R_0/R_1$) can guarantee a suitable gap between the flange portion and a curb or the like when the rim-mounted tire is driven onto a curb or the like, thereby suppressing deformation.

Note that in the context of the present invention, the "rim width direction outer end portion of the flange portion" indicates the outermost position of the flange portion in the rim width direction, and the "rim width direction central portion of the flange portion" indicates the outermost position of the flange portion in the rim radial direction.

In the rim for a pneumatic tire according to the present invention, a rim thickness at a width direction center of the rim is preferably greater than the rim thickness at a width direction outer end of the rim. The reason is that if the rim thickness $T_C$ at the width direction center of the rim is thicker than the rim thickness $T_S$ at the width direction outer end of the rim, then even if the rim-mounted tire is driven onto a curb or the like, the rim itself deforms when the sidewall portion of the mounted tire contacts the flange portion of the rim, thereby suppressing the sidewall portion of the tire from penetrating to the rim width direction outer end portion of the flange portion of the rim.

Note that in the context of the present invention, the "rim thickness" indicates the thickness as measured in a direction perpendicular to the rim surface.

In the rim for a pneumatic tire according to the present invention, the rim thickness preferably gradually decreases from the width direction center of the rim to the width direction outer end of the rim. The reason is that if the rim thickness is decreased gradually from the width direction center of the rim to the width direction outer end of the rim, then even if the rim-mounted tire is driven onto a curb or the like, the rim itself deforms when the sidewall portion of the mounted tire contacts the flange portion of the rim, thereby suppressing the sidewall portion of the tire from penetrating to the rim width direction outer end portion of the flange portion of the rim.

According to the rim for a pneumatic tire of the present invention, it is possible to suppress local deformation of the sidewall portion of a mounted tire and thus suppress the occurrence of damage to the sidewall portion.

BRIEF DESCRIPTION OF DRAWINGS

The present invention will be further described below with reference to the accompanying drawings, wherein.

DESCRIPTION OF EMBODIMENTS

Figure 1:
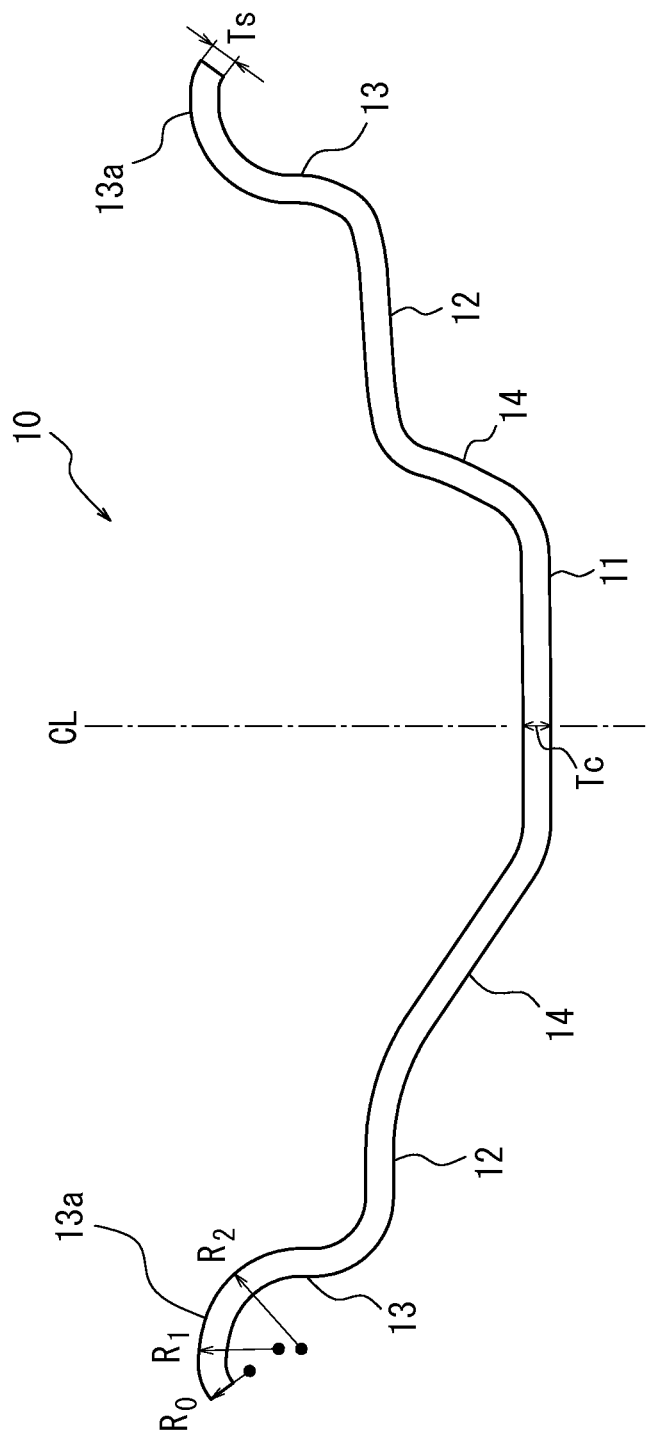
FIG. 1 illustrates the width direction cross-sectional shape of a representative rim for a pneumatic tire according to the present invention.

The following describes an embodiment of the present invention in detail with reference to the figures. FIG. 1 is a cross-sectional diagram illustrating the cross-sectional shape in the rim width direction of an example of a rim for a pneumatic tire according to the present invention.

This example of a rim for a pneumatic tire 10 has a generally cylindrical shape and comprises a well portion 11, a bead seat portion 12 provided outwards in the rim width direction on each side of the well portion 11 with a connecting portion 14 therebetween, and a flange portion 13 provided on each of the bead seat portions 12 outwards in the rim width direction, as illustrated by the shape of the cross-section in the rim width direction in FIG. 1.

The well portion 11 is a concavity provided at the bottom of the rim 10 to facilitate mounting the tire on the rim 10 and detaching the tire from the rim 10. The well portion 11 is located inwards from the bead seat portions 12 in the rim radial direction.

The bead seat portions 12 contact the bead portions of the tire (specifically, the bead base located between the bead toe and the bead heel) and support the load in the tire radial direction (i.e. the rim radial direction) when the tire is mounted on the rim 10. The rim width direction inner end of each bead seat portion 12 is connected to a rim width direction outer end of the well portion 11 via the connecting portion 14, the rim width direction inner end of which is inclined inwards in the rim radial direction. In other words, the pair of bead seat portions 12 in the rim 10 are separated from each other by the bead seat 11 and a pair of connecting portions 14.

The flange portions 13 support the bead portions of the tire from the side and hold the rim 10 when the tire is mounted on the rim 10. The flange portions 13 extend outwards in the rim radial direction from the rim width direction outer end of the bead seat portions 12. The rim radial direction outer end 13*a* (hereinafter referred to as "recurved portion") of each flange portion 13 is recurved outwards in the rim width direction.

In this example of the rim for a pneumatic tire 10, as viewed in a rim width direction cross-sectional diagram, the radius of curvature $R_0$ of the surface of each flange portion 13 at the rim width direction outer end portion thereof (i.e. the radius of curvature $R_0$ at the outermost position in the rim width direction along the curve of the surface of the flange portion 13) and the radius of curvature $R_1$ of the surface of each flange portion 13 at a rim width direction central portion thereof (i.e. the radius of curvature $R_1$ at the outermost position in the rim radial direction along the curve of the surface of the flange portion 13) satisfy the following relationship (1).

$$0.4 \leq R_0/R_1 \leq 1.0 \tag{1}$$

Figure 2:
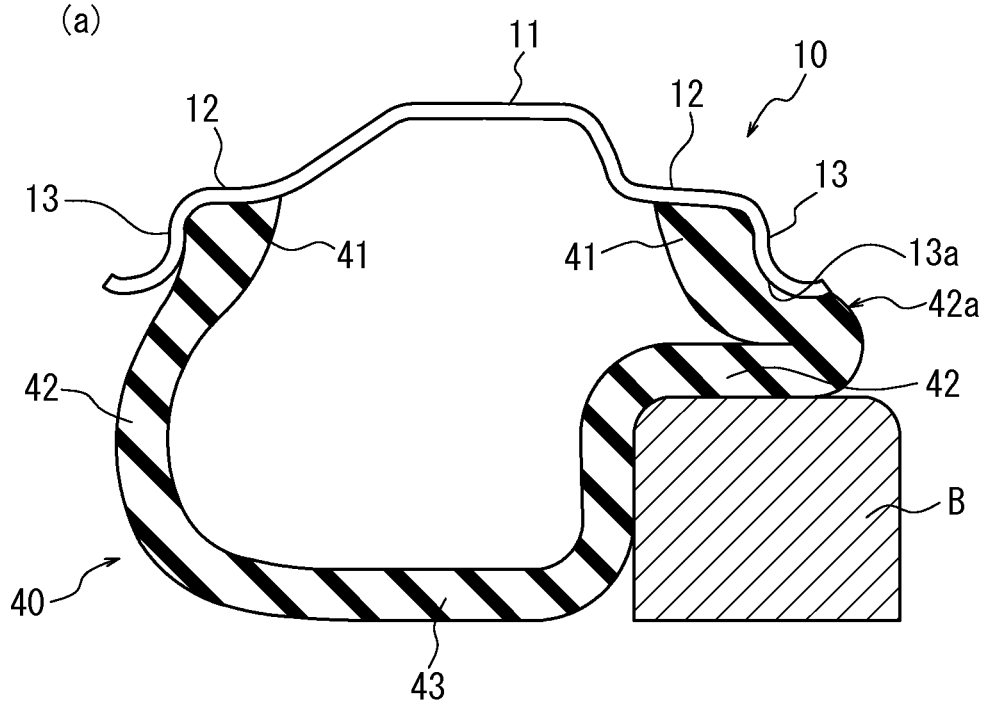
FIG. 2 illustrates cross-sectional diagrams of a rim-mounted tire driven onto a curb, with 2(*a*) illustrating a tire using the rim for a pneumatic tire shown in FIGS. 1, and 2(*b*) illustrating a tire using a conventional rim for a pneumatic tire shown in FIG. 3.
Figure 2:
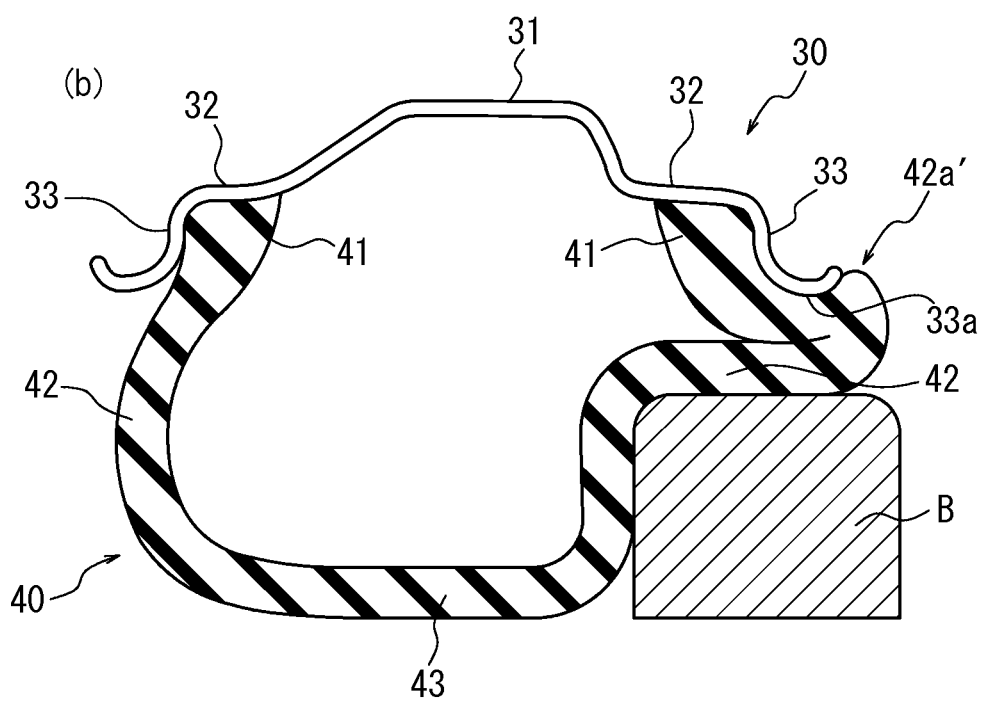
Figure 3:
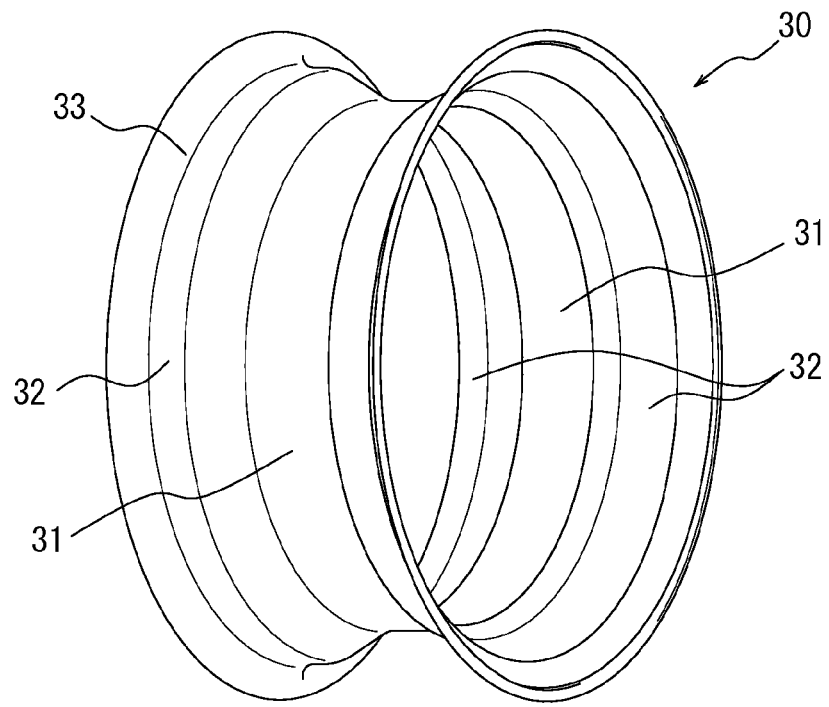
FIG. 3(*a*) is a perspective view of a conventional rim for a pneumatic tire, and 3(*b*) illustrates the width direction cross-sectional shape of the rim for a pneumatic tire shown in FIG. 3(*a*).
Figure 3:
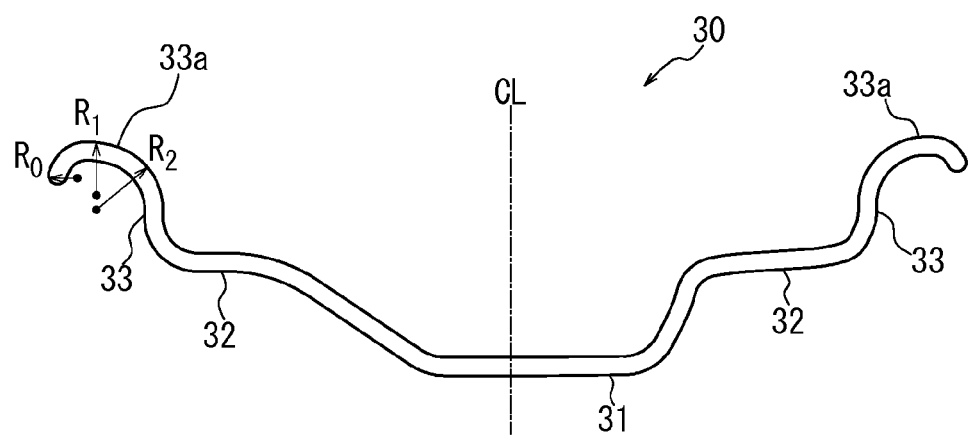

In a conventional rim for a pneumatic tire, as shown by the perspective view in FIG. 3(*a*) and the cross-sectional shape in the rim width direction in FIG. 3(*b*), the radius of curvature $R_0$ of the surface of the flange portion 33 of the rim 30 at the rim width direction outer end portion is extremely small as compared to the radius of curvature $R_1$ of the surface of the flange portion 33 at the rim width direction central portion (for example, $0.05 \geq R_0/R_1$). For this reason, when the tire 40 is mounted on a wheel using the conventional rim for a pneumatic tire 30 and is run, bending deformation of the sidewall portion 42 of the tire 40 when the tire 40 is driven onto a curb B or the like easily becomes locally large at a position 42*a*' at which the sidewall portion 42 contacts the rim width direction outer end portion of the flange portion 33, as illustrated in the rim width direction cross-sectional diagram of a tire and rim assembly in FIG. 2(*b*). In other words, with the conventional rim for a pneumatic tire 30, when the tire 40 mounted on the rim 30 is driven onto a curb B, a portion of the sidewall portion 42 the tire 40 penetrates to the recurved portion 33*a* of the flange portion 33 of the rim 30, in particular to the rim width direction outer end portion of the flange portion 33 and thus deforms greatly by bending. As a result, when using the conventional rim for a pneumatic tire 30, damage such as a crack on the outer surface of the sidewall portion 42 of the tire 40 easily occurs.

With this example rim for a pneumatic tire 10, however, the radii of curvature $R_0$ and $R_1$ satisfy the above relationship (1), and the radius of curvature $R_0$ of the surface of the flange portion 13 at the rim width direction outer end portion thereof is relatively large. As a result, when the tire 40 is mounted on a wheel using this example rim for a pneumatic tire 10 and is run, the sidewall portion 42 of the tire 40 does not easily suffer a locally large bending deformation even if the tire 40 is driven onto a curb B or the like. Specifically, in the rim for a pneumatic tire 10, the surface of the flange portion 13 curves gradually from the rim width direction central portion thereof to the rim width direction outer end portion thereof. Therefore, even if the sidewall portion 42 penetrates to the recurved portion 13*a* of the flange portion 13, in particular to the rim width direction outer end portion of the flange portion 13, the sidewall portion 42 does not easily deform locally at the position 42*a* of contact with the rim width direction outer end portion of the flange portion 13.

Accordingly, with the rim for a pneumatic tire 10 it is possible to suppress local deformation of the sidewall portion 42 of the mounted tire 40. Specifically, according to the rim for a pneumatic tire 10, it is possible to distribute the deformation that is locally large at the position 42*a*' when using the conventional rim for a pneumatic tire 30, thereby suppressing the occurrence of damage to the sidewall portion 42.

Note that the pneumatic tire 40 illustrated in FIGS. 2(*a*) and 2(*b*) is not particularly limited, and is a regular pneumatic tire provided with a carcass (not illustrated) and at least one belt layer (not illustrated) on the outer periphery of a crown portion of the carcass, the carcass being formed by a ply that extends toroidally from a tread portion 43 across a pair of sidewall portions 42 to a pair of bead portions 41.

From the perspective of further reducing the occurrence of damage at the sidewall portion 42 of the tire 40 when the tire 40 is driven onto a curb B, the rim thickness $T_S$ at a width direction outer end of the rim 10 is preferably less than the rim thickness $T_C$ at a width direction center CL of the rim 10, and the rim thickness more preferably decreases gradually from the width direction center CL to the width direction outer end of the rim 10. The reason is that with this structure, even if the sidewall portion 42 contacts the recurved portion 13a of the flange portion 13 of the rim 10 when the tire 40 is driven onto a curb B, the rim 10 itself deforms inwards in the rim radial direction, thereby suppressing the sidewall portion 42 from penetrating to the rim width direction outer end portion of the flange portion 13 of the rim 10.

Note that the radius of curvature $R_1$ is usually from 4.0 mm to 6.0 mm. Furthermore, from the perspective of suppressing the occurrence of damage to the sidewall portion 42 of the tire 40, the radius of curvature $R_0$ is preferably from 0.5 mm to 5.5 mm.

While an embodiment of the present invention has been described with reference to the drawings, the rim for a pneumatic tire according to the present invention is not limited to the above example, and modifications may be made to the rim for a pneumatic tire according to the present invention as necessary. For example, the rim for a pneumatic tire according to the present invention may be provided with a hump to prevent the tire from dislodging from the rim when tire air pressure is low. Furthermore, the rim for a pneumatic tire according to the present invention may be a wide, flat-bottom rim without a well portion.

EXAMPLES

The present invention is described in further detail below through examples, yet the present invention is in no way limited to the following examples.

Example 1

An FEM model for simulation of a rim for a pneumatic tire having a size of 7.0 J×17, the structure illustrated in FIG. 1, and the specifications listed in Table 1 was created, and the performance thereof was assessed using the method described below. Table 1 lists the results of assessment.

Conventional Example 1

An FEM model for simulation of a rim for a pneumatic tire having a size of 7.0 J×17, the structure illustrated in FIGS. 3(a) and 3(b), and the specifications listed in Table 1 was created, and the performance thereof was assessed using the method described below. Table 1 lists the results of assessment.

Examples 2 to 7, Comparative Examples 1 and 2

FEM models for simulation of rim for a pneumatic tires were created to be the same as Example 1, except for a change in the radius of curvature of the flange portion as listed in Table 1. Performance was then assessed with the same method as for Example 1. Table 1 lists the results of assessment.

Example 8

An FEM model for simulation of a rim for a pneumatic tire was created to be the same as Example 5, except that the rim thickness was decreased gradually from the width direction center to the width direction outer end of the rim. Performance was then assessed with the same method as for Example 1. Table 1 lists the results of assessment. Note that the rim thickness was decreased gradually at a rate of 0.04 mm per 1 mm in the rim width direction.

Damage to Sidewall Portion

FEM models for simulation were created for tires, with a size of 215×45R17, mounted on the produced rims, and simulations were performed by pushing the tires onto a 60 cm high curb under the conditions of 230 kPa air pressure and a 10 kN load. The maximum distortion in the tire radial direction (rim radial direction) of the sidewall portion contacting the flange portion of the rim was calculated and assessed as an index with Conventional Example 1 as 100. In Table 1, a smaller index indicates less local deformation of the sidewall portion and a lower probability of damage occurring.

TABLE 1

|  | Radius of Curvature of Flange Portion (mm) | | | | | Thickness $T_C$ of | Thickness $T_S$ of | Damage to Sidewall |
| --- | --- | --- | --- | --- | --- | --- | --- | --- |
|  | $R_2$ | $R_1$ | $R_0$ | $R_0/R_1$ | Rim Thickness | Center (mm) | Outer End (mm) | Portion |
| Conventional Example 1 | 9.5 | 5.5 | 0.5 | 0.09 | uniform | 7.0 | 7.0 | 100 |
| Comparative Example 1 | 9.5 | 5.5 | 1.0 | 0.18 | uniform | 7.0 | 7.0 | 95 |
| Comparative Example 2 | 9.5 | 5.5 | 2.0 | 0.36 | uniform | 7.0 | 7.0 | 90 |
| Example 1 | 9.5 | 5.5 | 2.2 | 0.40 | uniform | 7.0 | 7.0 | 88 |
| Example 2 | 9.5 | 5.5 | 2.5 | 0.45 | uniform | 7.0 | 7.0 | 87 |
| Example 3 | 9.5 | 5.5 | 3.0 | 0.55 | uniform | 7.0 | 7.0 | 85 |
| Example 4 | 9.5 | 5.5 | 4.0 | 0.73 | uniform | 7.0 | 7.0 | 84 |
| Example 5 | 9.5 | 5.5 | 5.5 | 1.00 | uniform | 7.0 | 7.0 | 81 |
| Example 6 | 9.5 | 5.5 | 4.4 | 0.80 | uniform | 7.0 | 7.0 | 83 |
| Example 7 | 9.5 | 5.5 | 4.9 | 0.90 | uniform | 7.0 | 7.0 | 82 |
| Example 8 | 9.5 | 5.5 | 5.5 | 1.00 | gradually decreasing | 7.0 | 3.5 | 76 |

From Table 1, it is clear that for the rims of Examples 1 to 8 for which $R_0/R_1$ is at least 0.40 and at most 1.0, the occurrence of damage to the sidewall portion of the tire can be greatly suppressed. Furthermore, it is clear that in Example 8, in which the rim thickness was gradually decreased from the width direction center to the width direction outer end of the rim, the occurrence of damage to the sidewall portion of the tire can be even further suppressed.

INDUSTRIAL APPLICABILITY

According to the rim for a pneumatic tire of the present invention, it is possible to suppress local deformation of the sidewall portion of a mounted tire and thus suppress the occurrence of damage to the sidewall portion.

REFERENCE SIGNS LIST

10: Rim for a pneumatic tire
11: Well portion
12: Bead seat portion
13: Flange portion
13a: Recurved portion (rim radial direction outer end)
14: Connecting portion
30: Rim
31: Well portion
32: Bead seat portion
33: Flange portion
33a: Recurved portion (rim radial direction outer end)
40: Pneumatic tire
41: Bead portion
42: Sidewall portion
43: Tread portion

The invention claimed is:

1. A rim for a pneumatic tire, comprising a pair of bead seat portions separated from each other in a rim width direction and a flange portion extending outwards in a rim radial direction from a rim width direction outer end of each bead seat portion, a rim radial direction outer end of the flange portion being recurved outwards in the rim width direction, wherein a radius of curvature of a surface of the flange portion at a rim width direction outer end portion of the flange portion is at least 0.4 times and at most 1.0 times a radius of curvature of the surface of the flange portion at a rim width direction central portion of the flange portion, and a rim thickness at a width direction center of the rim is greater than a rim thickness at a width direction outer end of the rim and thickness of the rim gradually decreases from the width direction center of the rim to the width direction outer end of the rim.

* * * * *